(12) United States Patent
Cheng (10) Patent No.: US 11,300,074 B2
(45) Date of Patent: Apr. 12, 2022

(54) VIBRATION ISOLATION STRUCTURE OF LINEAR OSCILLATORY MOTOR AND STIRLING ENGINE

(71) Applicant: NINGBO CHINA STIRLING ENGINE MANUFACTURING CO.,LTD, Ningbo (CN)

(72) Inventor: Lu Cheng, Ningbo (CN)

(73) Assignee: NINGBO CHINA STIRLING ENGINE MANUFACTURING CO., LTD, Ningbo (CN)

( * ) Notice: Subject to any disclaimer, the term of this patent is extended or adjusted under 35 U.S.C. 154(b) by 0 days.

(21) Appl. No.: 17/041,457

(22) PCT Filed: Apr. 1, 2019

(86) PCT No.: PCT/CN2019/080900
§ 371 (c)(1),
(2) Date: Sep. 25, 2020

(87) PCT Pub. No.: WO2019/192437
PCT Pub. Date: Oct. 10, 2019

(65) Prior Publication Data
US 2021/0017934 A1   Jan. 21, 2021

(30) Foreign Application Priority Data

Apr. 2, 2018   (CN) .......................... 201810283590.1

(51) Int. Cl.
*F02G 1/053*   (2006.01)
*H02K 5/24*    (2006.01)
(Continued)

(52) U.S. Cl.
CPC .............. *F02G 1/053* (2013.01); *F16F 15/06* (2013.01); *F16F 15/085* (2013.01); *H02K 5/24* (2013.01);
(Continued)

(58) Field of Classification Search
CPC . F02G 2275/10; H02K 5/24; F16F 15/04–085
See application file for complete search history.

(56) References Cited

U.S. PATENT DOCUMENTS 7,055,321 B2 †   6/2006   Yoshida

FOREIGN PATENT DOCUMENTS

CN    100376780 C    3/2008
CN    207064536 U    3/2008
(Continued)

*Primary Examiner* — Laert Dounis (57) ABSTRACT

The disclosure provides a vibration isolation structure for linear oscillating motor and Stirling engine, wherein the said vibration isolation structure comprises a first vibration isolation device and a second vibration isolation device. The first vibration isolation device is set between the fixed hood and the housing of the linear oscillating motor to attenuate the high-frequency and small-amplitude vibrations from the linear oscillating motor. The first vibration isolation device comprises a first set of tension springs and a second set of tension springs, and a lateral gap is formed between the fixed hood and the linear oscillating motor. The second vibration isolation device is set in the said lateral gap to attenuate the low-frequency and large-amplitude vibrations from the linear oscillating motor. The second vibration isolation device comprises at least two sets of position-limiting protrusions and position-limiting blocks, and the position-limiting protrusion and position-limiting block are set in a match at the linear oscillating motor and the fixed hood respectively or reversely. Also disclosed is a Stirling engine assembled with a linear oscillating motor that comprising with an aforementioned vibration isolation structure. The vibration isolation structure improves the stability of the reciprocating linear oscillating motor and the Stirling engine, and reduces mechanical vibrations and noises.

11 Claims, 5 Drawing Sheets

(51) Int. Cl.
    *F16F 15/06*     (2006.01)
    *F16F 15/08*     (2006.01)
    *F25D 23/00*     (2006.01)

(52) U.S. Cl.
    CPC ...... *F02G 2243/02* (2013.01); *F02G 2275/10* (2013.01); *F25B 2500/13* (2013.01); *F25D 23/006* (2013.01)

(56) References Cited

FOREIGN PATENT DOCUMENTS

| | | | | |
|---|---|---|---|---|
| CN | 100420896 | A | | 9/2008 |
| CN | 100578007 | A | | 1/2010 |
| CN | 204361829 | U | | 5/2015 |
| CN | 205402178 | U | | 7/2016 |
| CN | 108131418 | A | * | 6/2018 |
| CN | 108301937 | A | | 7/2018 |
| CN | 211830438 | U | * | 10/2020 |
| JP | 2006017432 | A | | 1/2006 |
| JP | 2009047139 | A | * | 3/2009 ............ F01B 11/007 |

\* cited by examiner
† cited by third party

VIBRATION ISOLATION STRUCTURE OF LINEAR OSCILLATORY MOTOR AND STIRLING ENGINE

CROSS REFERENCE TO RELATED APPLICATION

This application is a national stage application of International application number PCT/CN2019/080900, filed Apr. 1, 2019, titled "VIBRATION ISOLATION STRUCTURE OF LINEAR OSCILLATORY MOTOR AND STIRLING ENGINE", which claims the priority benefit of Chinese Patent Application No. 201810283590.1, filed on Apr. 2, 2018, the disclosure of which are hereby incorporated by reference in entirety.

TECHNICAL FIELD

The present disclosure involves a field of motor technology, in particular to a vibration isolation structure for linear oscillating motor and Stirling engine.

BACKGROUND

In the past, the mechanical vibrations (hereinafter referred to as internal vibration) caused by the linear oscillating motor were absorbed by the vibration-absorbing elements, which were installed directly on the linear oscillating motor. But these vibration-absorbing elements couldn't fully absorb the internal vibrations, thus suspension structures are adopted and installed in the machine to prevent the internal vibrations from being transmitted from the linear oscillating motor to other parts of the machine. In the current technologies, the machine assembled with the linear oscillating motor and the suspension structure is usually serve as anti-vibration cooling box that contains the suspension structure (Patent no. JPA2003-311859). For this suspension structure, the foot part of the linear oscillating motor is clamped by a compression spring from the axial up-down direction of the linear oscillating motor.

However, the following problems exist in such suspension structure of the linear oscillating motor. The axial vibration component of the internal vibration caused by the linear oscillating motor can be fully absorbed, thus the internal vibration transmitted to the machine assembled with the linear oscillating motor can be reduced as much as possible. Due to the installation error of the linear oscillating motor and some other reasons, the radial vibration component of the internal vibration in the reciprocating linear motion direction cannot be attenuated sufficiently. Besides, when handling, moving or transporting the machine assembled with the above-mentioned linear oscillating motor, the external disturbance may cause vibrations (hereinafter referred to as external vibration). The radial component of the external vibration can't be fully absorbed as well and the collision between the linear vibration motor and the fixed hood occurs. This is because the compression spring is adopted in the suspension structure. When the linear oscillating motor vibrates in the radial direction of the reciprocating linear motion, the compression spring will extend, causing the compression spring to hinder the moving direction of the linear oscillating motor and lose its efficiency. Moreover, in order to make the suspension structure operate normally, a guide shaft parallel to the axial direction of the linear oscillating motor must be provided in the central part of the compression spring. When the radial vibration amplitude of the linear oscillating motor is too large, a technical problem that the compression spring collides with the guide shaft may occur.

SUMMARY

Aimed at the shortages of existing technology and the technical problem, the present disclosure provides a vibration isolation structure for linear oscillating motor and Stirling engine, which can effectively decrease the transmission of the vibration caused by the linear oscillating motor to the outside and then reduce the noise.

The technical solution is as follows:

The present disclosure provides a vibration isolation structure for linear oscillating motor, which comprises a first vibration isolation device and a second vibration isolation device. The first vibration isolation device is set between the fixed hood and the housing of the linear oscillating motor to attenuate the high-frequency and small-amplitude vibrations from the linear oscillating motor. The first vibration isolation device comprises a first set of tension springs and a second set of tension springs. The said first set of tension springs and the said second set of tension springs are both connected to the fixed hood and the housing to suspend the linear oscillating motor in the fixed hood, forming a lateral gap between the linear oscillating motor and the fixed hood. The second vibration isolation device is set in the said lateral gap to attenuate the low-frequency and large-amplitude vibrations from the linear oscillating motor. The second vibration isolation device comprises at least two sets of position-limiting protrusions and position-limiting blocks. The said position-limiting protrusion and position-limiting block are set in a match on the linear oscillating motor and the fixed hood respectively or reversely, which can limit the moving range of the linear oscillating motor in the fixed hood.

In some embodiments, the said position-limiting block comprises a position-limiting groove for the insertion of the said position-limiting protrusion, and a first movable gap between the position-limiting groove and the position-limiting protrusion can limit the axial vibration and circumferential vibration of the linear oscillating motor to a certain amplitude. Preferably, the axes of the said position-limiting groove and the said position-limiting protrusion are both perpendicular to the axis of the linear oscillating motor. Preferably, the material of the said position-limiting block is rubber and the said position-limiting protrusion is cylinder-shaped, and a round hole is drilled in the rubber block to form the position-limiting groove.

In some embodiments, the said position-limiting block is installed on the fixed hood, and a second movable gap between the position-limiting block and the linear oscillating motor can limit the radial vibration of the linear oscillating motor to a certain amplitude.

In some embodiments, the external connection plate is fixedly installed on the said fixed hood and the said position-limiting block is installed on the external connection plate, while the internal connection plate is fixedly installed on the said linear oscillating motor and the said position-limiting protrusion is installed on the internal connection plate. Preferably, the said position-limiting block is detachably installed on the external connection plate, which can adjust the moving range of the linear oscillating motor by replacing the position-limiting block. Preferably, the said external connection plate comprises a mounting groove, and the said position-limiting block is embedded in the mounting groove while keeping the top of the position-limiting block protruding out of the mounting groove. Preferably, the said first set of tension springs comprises at least three first tension springs, which are evenly distributed around the circumference of the linear oscillating motor in an upward direction; the said second set of tension springs comprises at least one second tension spring, and the spring forces applied to the linear oscillating motor by the first set of tension springs and the second set of tension springs form a reaction force pair. Preferably, the said first set of tension springs comprises four first tension springs while the second set of tension springs comprises four second tension springs, and the first tension spring and the second tension spring are arranged in pairs. Preferably, the said first tension spring and the said second tension spring are arranged symmetrically, and the first tension spring is set tension in the oblique-upward direction while the second tension spring is set tension in the oblique-downward direction. Preferably, the two ends of the said first tension spring are connected to the internal connection plate and the upper part of the external connection plate respectively, while the two ends of the said second tension spring are connected to the internal connection plate and the lower part of the external connection plate respectively. Preferably, the two ends of the said internal connection plate and the said external connection plate are provided with a hook, and the ends of the said first tension spring and the said second tension spring are all installed on the corresponding hooks.

The present disclosure provides a Stirling engine that comprises a linear oscillating motor and a fixed hood, and the said linear oscillating motor is installed in the fixed hood through the aforementioned vibration isolation structure. Preferably, the said linear oscillating motor is a reciprocating linear vibrating motor comprising stator, piston and leaf spring; the piston is installed in the stator and the leaf spring is utilized to connect the piston and the stator; the said stator is fixedly installed on the housing of the linear oscillating motor. Preferably, the power output side of the said linear oscillating motor is provided with a heat dissipation ring, and the soft vibration-absorbing material is filled between the said heat dissipation ring and the fixed hood.

Due to the adoption of the above technical solution, the disclosure has the following beneficial effects:

The first vibration isolation device consisting of tension springs is set between the linear oscillating motor and the fixed hood to attenuate the high-frequency and small-amplitude vibrations, which are caused by normal operation of the linear oscillating motor. In addition, the second vibration isolation device is set to attenuate the low-frequency and large-amplitude vibrations from the linear oscillating motor caused by external disturbances or the abnormal operations. Therefore, the disclosure can not only eliminate the internal vibrations but also the external vibrations, and the mechanical vibrations transmitted from the linear oscillating motor to the fixed hood can be effectively isolated. The disclosure can improve the stability of the entire operation system, and protect the linear oscillating motor from collision damage as well as reduce the operation noise.

The first set of tension springs and the second set of tension springs of the present disclosure can suspend the linear oscillating motor in the fixed hood, forming a certain lateral gap between the housing of the linear oscillating motor and the fixed hood. Thus, the isolation between the linear oscillating motor and the fixed hood can be realized, and the suspension structure of tension springs can effectively absorb the high-frequency and small-amplitude vibrations of the linear oscillating motor.

The matching of the position-limiting block and the position-limiting protrusion of the present disclosure can limit the moving range of the linear oscillating motor in the fixed hood. The linear oscillating motor can only move within a certain range, thus the vibration amplitude range of the linear oscillating motor is limited and the low-frequency and large-amplitude vibrations from the linear oscillating motor are attenuated. Besides, it can avoid transmitting the high-frequency and small-amplitude vibrations from the linear oscillating motor to the fixed hood through the position-limiting block and the position-limiting protrusion.

The first vibration isolation device and the second vibration isolation device of the present disclosure are complementary to each other. Low-frequency and large-amplitude vibrations are prone to occur especially in the process of handling, moving or transporting the machine assembled with the linear oscillating motor. Under this condition, the combination of the first vibration isolation device and the second vibration isolation device constitutes the vibration isolation structure, which can still keep the linear oscillating motor in a stable working state. The vibration isolation structure can effectively reduce the transmission of mechanical vibrations from the linear oscillating motor to the fixed hood, and can also prevent the collisions between the linear oscillating motor and the fixed cover, thus the service life of the reciprocating linear oscillating motor is increased.

As shown in FIGs above, 1 indicates the fixed hood, 2 indicates the linear oscillating motor, 21 indicates the heat dissipation ring, 3 indicates the first vibration isolation device, 31 indicates the first set of tension springs, 311 indicates the first tension spring, 32 indicates the second set of tension springs, 321 indicates the second tension spring, 33 indicates the internal connection plate, 34 indicates the external connection plate, 4 indicates the second vibration isolation device, 41 indicates the position-limiting block, 411 indicates the position-limiting groove, 42 indicates the position-limiting protrusion.

DETAILED DESCRIPTION OF THE PREFERRED EMBODIMENTS

The following implementations are specific embodiments of the present disclosure in conjunction with the accompanying drawings to further illustrate the technical solutions of the present disclosure, but the present disclosure is not limited to these embodiments.

In order to make the objectives, technical solutions, and advantages of the embodiments of the present disclosure clearer, the components of the embodiments of the present disclosure may be arranged and designed in various configurations. Based on the embodiments of the present disclosure, all other embodiments obtained by those of ordinary skill in the art without creative work shall fall within the protection scope of the present disclosure.

It should be noted that similar labels and letters denote similar items in the following drawings. Therefore, once an item is defined in one drawing, it does not need to be further defined and explained in the subsequent drawings.

In the description of the present disclosure, it should be noted that the orientation or position relationship indicated by the terms "center", "upper", "lower", "left", "right", "vertical", "horizontal", "internal", "external", etc. is based on the orientation or positional relationship shown in the drawings. These terms are only used for the convenience of describing the present disclosure and simplifying the description, rather than to indicate or imply that the device or components referred to must have a specific orientation and must be constructed and operated in a specific orientation, therefore these terms cannot be understood as a limitation of the disclosure. Besides, the terms "first", "second", and "third" are only used for descriptive purposes, and cannot be understood as indicating or implying relative importance.

In the description of the present disclosure, it should be noted that, unless otherwise specified or limited, the terms "installation", "set" and "connection" should be understood in a broad sense. For example, the term "connection" can be understood as a fixed connection, a detachable connection, an integrated connection, a mechanical connection, an electrical connection, a direct connection, an indirect connection through an intermediate medium, and an internal connection between two components. For those of ordinary skill in the art, the specific meaning of the above-mentioned terms in the disclosure can be understood in specific situations.

Some embodiments of the present disclosure will be described in detail with reference to the attached drawings. In the case of no conflict, the features in the following embodiments can be combined with each other.

Embodiment 1

The linear oscillating motor comprises stator, piston and housing. One end of the piston is set freely while the other end is connected with the stator through a scroll spring, and the stator is fixedly installed on the housing. During operation, an alternating magnetic field is generated on the armature winding of the stator. The piston coil drives the piston to output linear motion under the excitation of the stator magnetic field. By the action of the scroll spring, the piston oscillates reciprocally with high frequency in the stator cavity, in other words, doing the reciprocating linear motion with relatively high frequency. The normal working frequency range is 30-120 Hz, and the high-frequency and small-amplitude mechanical vibrations will not be produced if the frequency is low enough, such as the slow-speed linear motor that reciprocates every few minutes or even tens of minutes. The linear oscillating motor is suitable for various low-power vibration occasions. In the present disclosure, it is used as a Stirling engine, that is, used to push the reciprocating movement of the piston of the Stirling engine. In the prior art, the mechanical vibrations caused by the high-frequency reciprocating movement of the piston will be transmitted to the external fixed hood, causing the vibration and noise of the entire machine.

A vibration isolation structure for linear oscillating motor 2 is shown in FIG. 1 to FIG. 5, which comprises a first vibration isolation device 3 and a second vibration isolation device 4. The first vibration isolation device 3 is set between the fixed hood 1 and the housing of the linear oscillating motor 3 to attenuate the high-frequency and small-amplitude vibrations from the linear oscillating motor. The first vibration isolation device 3 comprises a first set of tension springs 31 and a second set of tension springs 32. The said first set of tension springs 31 and the said second set of tension springs 32 are both connected to the fixed hood 1 and the housing to suspend the linear oscillating motor 2 in the fixed hood 1, forming a lateral gap between the linear oscillating motor 2 and the fixed hood 1. The second vibration isolation device 4 is set in the said lateral gap to attenuate the low-frequency and large-amplitude vibrations from the linear oscillating motor 2. The second vibration isolation device 4 comprises at least two sets of position-limiting protrusions 42 and position-limiting blocks 41. The said position-limiting protrusion 42 and position-limiting block 41 are set on the linear oscillating motor 2 and the fixed hood 1 respectively or reversely. The matching of the position-limiting block 41 and the position-limiting protrusion 42 can limit the moving range of the linear oscillating motor 2 in the fixed hood 1.

It should be noted that the lateral gap in this embodiment refers to the gap in the radial direction of the linear oscillating motor 2, which is also between the inner wall of the fixed hood 1 and the outer wall of the housing of the linear oscillating motor 2. This lateral gap isolates the linear oscillating motor 2 from the fixed hood 1, thereby the transmission of mechanical vibrations to the fixed hood 1 is prevented by avoiding the direct contacts between the linear oscillating motor 2 and the fixed hood 1.

Figure 3:
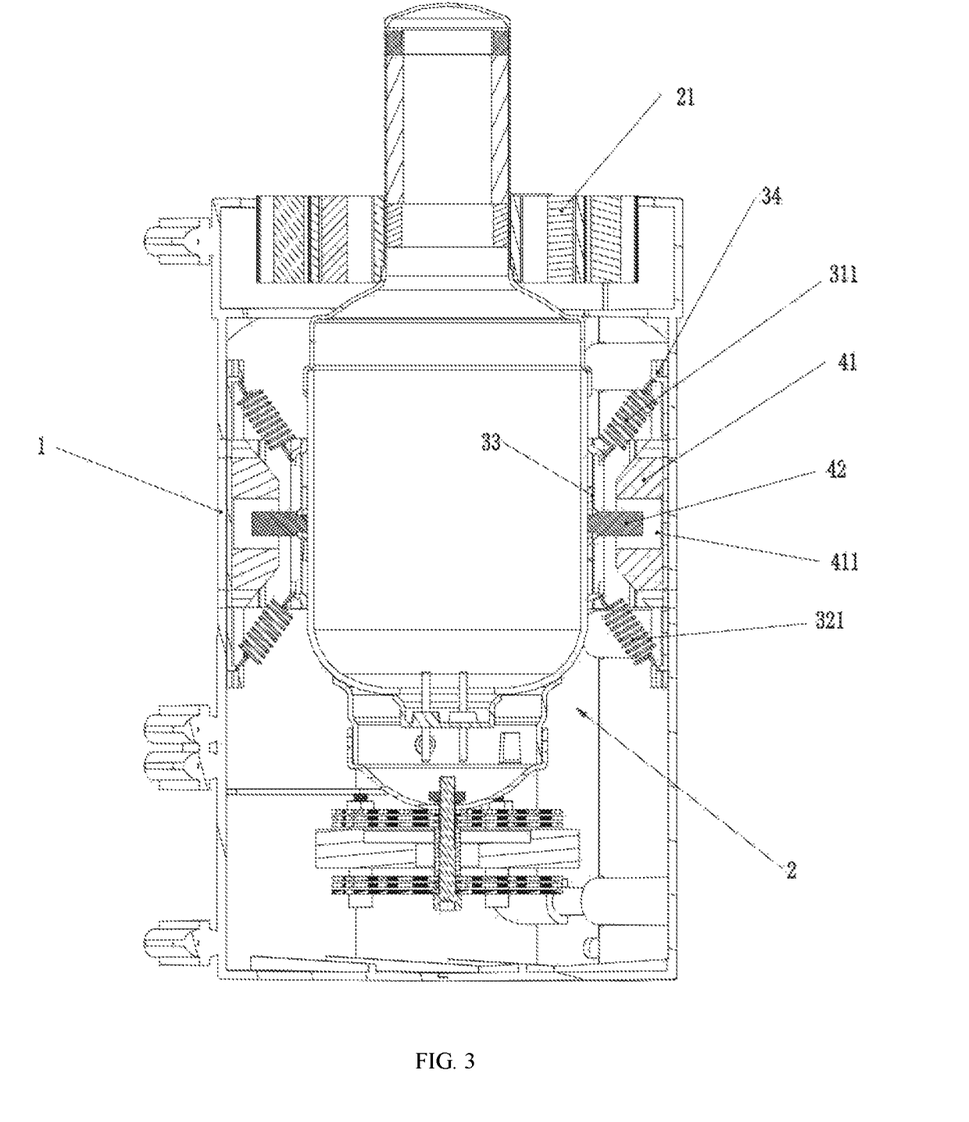
FIG. 3 shows the cross-sectional view of the structure of FIG. 1.
Figure 4:
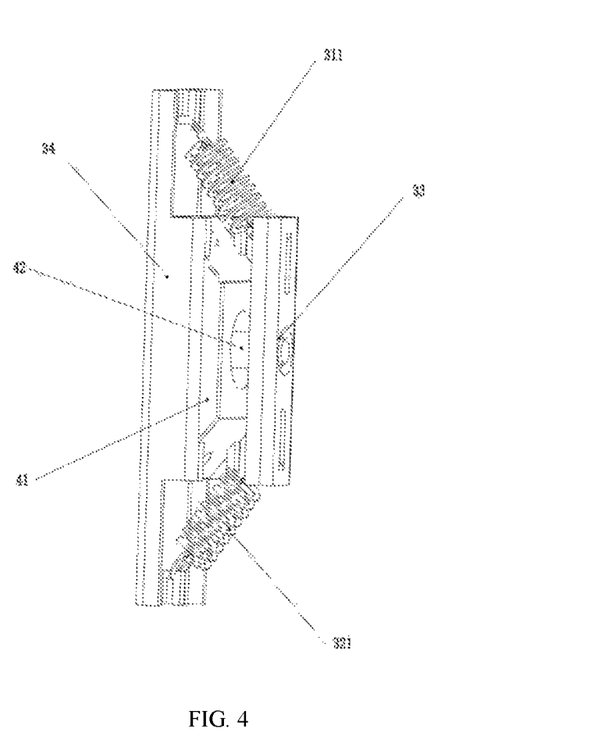
FIG. 4 shows the assembly view of a portion of structure components in embodiment 1.
Figure 5:
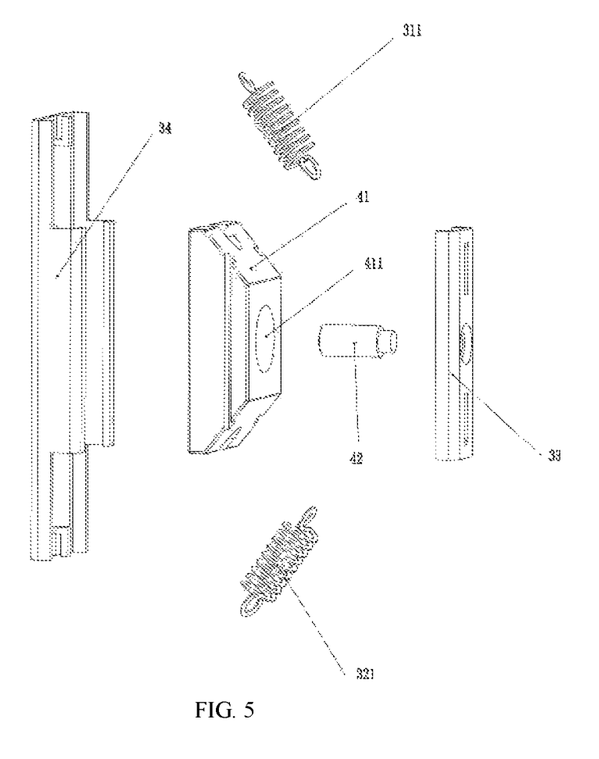
FIG. 5 shows the exploded view of the components in FIG. 4.

As shown in FIG. 3, FIG. 4 and FIG. 5, the said position-limiting block 41 comprises a position-limiting groove 411, and the said position-limiting protrusion 42 is inserted into the position-limiting groove 411. A first movable gap between the position-limiting groove 411 and the position-limiting protrusion 42 can limit the axial vibration and circumferential vibration of the linear oscillating motor 2 to a certain amplitude. The axes of the said position-limiting groove 411 and the said position-limiting protrusion 42 are both perpendicular to the axis of the linear oscillating motor 2. The material of the said position-limiting block 41 is rubber and the said position-limiting protrusion 42 is cylinder-shaped. A round hole is drilled in the rubber block to form the position-limiting groove 411 and this position-limiting groove 411 can also be other special-shaped holes.

As shown in FIG. 3, the said position-limiting block 41 is installed on the fixed hood 1, and a second movable gap between the position-limiting block 41 and the linear oscillating motor 2 can limit the radial vibration of the linear oscillating motor to a certain amplitude. The setting of the first movable gap and the second movable gap can limit the moving range of the linear oscillating motor 2 in the axial, circumferential and radial directions respectively. Thereby the vibration amplitude of the linear oscillating motor 2 is limited, and the low-frequency and small-amplitude mechanical vibrations from the linear oscillating motor 2 are attenuated.

Figure 1:
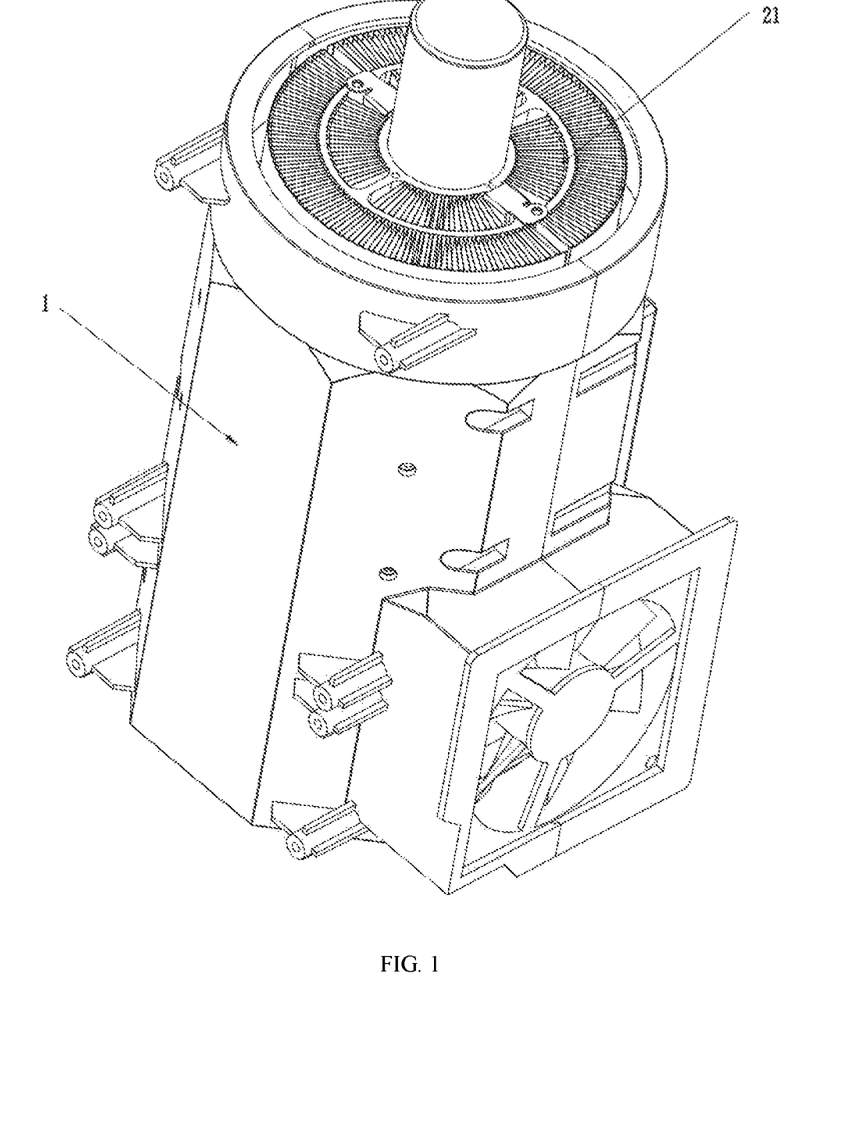
FIG. 1 shows the schematic diagram of the overall structure of embodiment 1.
Figure 2:
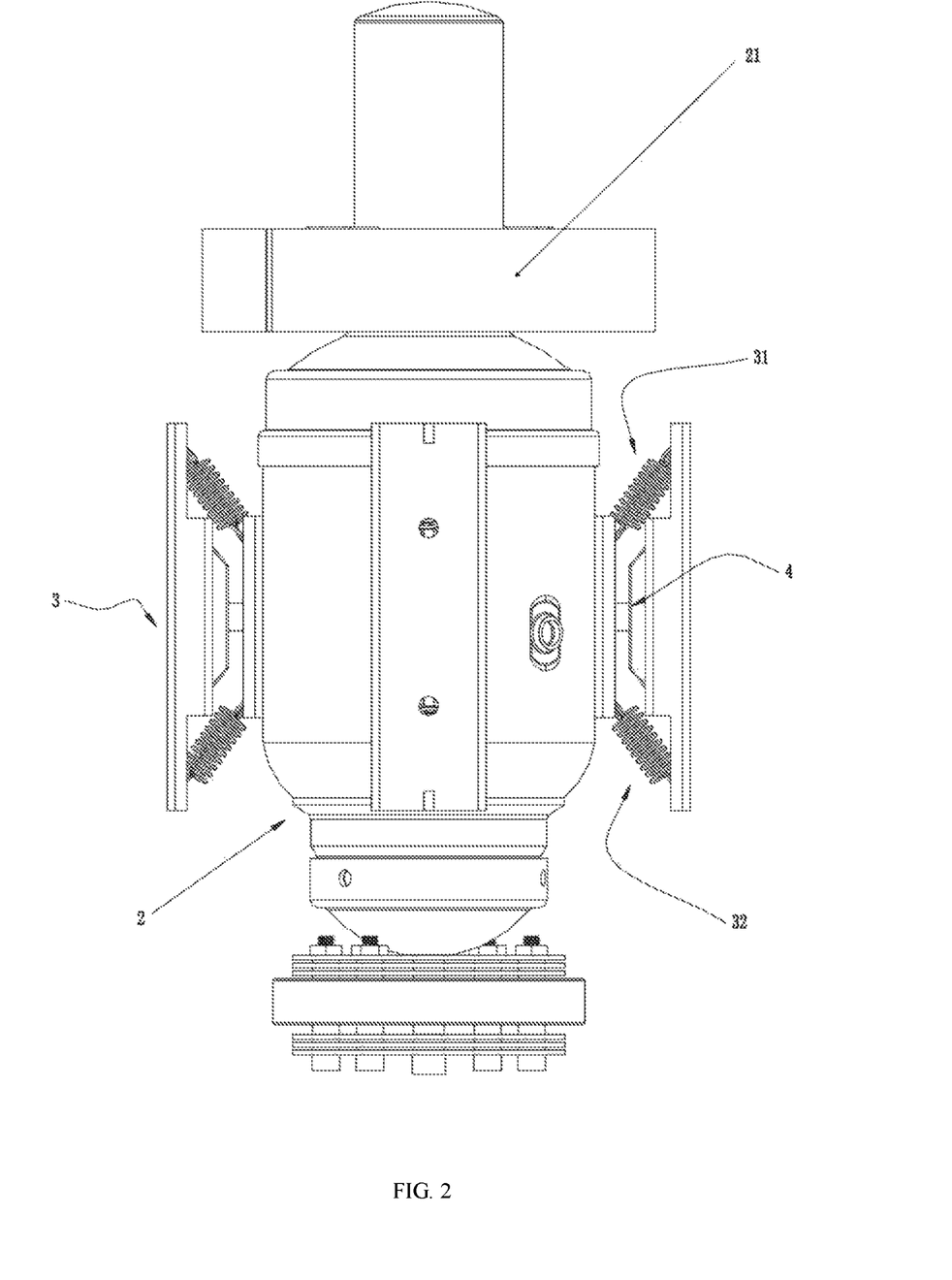
FIG. 2 shows the internal structure of FIG. 1.

As shown in FIG. 2 and FIG. 3, the external connection plate 34 is fixedly installed on the said fixed hood 1 and the said position-limiting block 41 is installed on the external connection plate 34, while the internal connection plate 33 is fixedly installed on the said linear oscillating motor 2 and the said position-limiting protrusion 42 is installed on the internal connection plate 33. The said position-limiting block 41 is detachably installed on the external connection plate 34, which can adjust the moving range of the linear oscillating motor 2 by replacing the position-limiting block 41. The said external connection plate 34 comprises a mounting groove, and the said position-limiting block 41 is embedded in the mounting groove while keeping the top of the position-limiting block 41 protruding out of the mounting groove. The said first set of tension springs 31 comprises at least three first tension springs 311, which are evenly distributed around the circumference of the linear oscillating motor 2 in an upward direction. The said second set of tension springs 32 comprises at least one second tension spring 321, and the spring forces applied to the linear oscillating motor 2 by the first set of tension springs 31 and the second set of tension springs 32 form a reaction force pair. It should be noted that the magnitudes of two spring forces in the reaction force pair are not equal as a result of the existence of the motor's dead-weight. The said first set of tension springs 31 comprises four first tension springs 311 while the second set of tension springs 32 comprises four second tension springs 321, and the first tension spring 311 and second tension spring 321 are arranged in pairs. The said first tension spring 311 and the said second tension spring 321 are arranged symmetrically, and the first tension spring 311 is set tension in the oblique-upward direction while the second tension spring 321 is set tension in the oblique-downward direction. The two ends of the said first tension spring 311 are connected to the internal connection plate 33 and the upper part of the external connection plate 34 respectively, while the two ends of the said second tension spring 321 are connected to the internal connection plate 33 and the lower part of the external connection plate 34 respectively. The two ends of the said internal connection plate 33 and the said external connection plate 34 are provided with a hook, and the ends of the said first tension spring 311 and the said second tension spring 321 are all installed on the corresponding hooks.

As shown in FIG. 2 and FIG. 5, the spring forces applied by the first set of tension springs 31 and the second set of tension springs 32 in the axial direction of the linear oscillating motor 2 are exactly opposite, and the two spring forces form a reaction force pair to suspend the linear oscillating motor 2 in the fixed hood 1. If the linear oscillating motor 2 is placed vertically, the spring force applied by the first set of tension springs 31 on the linear oscillating motor 2 is upward, while the spring force applied by the second set of tension springs 32 on the linear oscillating motor 2 is downward. The spring force applied by the first set of tension springs 31 equals to the superimposition of the spring force applied by the second set of tension springs 32 and the dead-weight force of the linear oscillating motor 2, which leads to a balance of the applied forces.

In this embodiment, the first set of tension springs 31 comprises four first tension springs 311, which are evenly distributed in the circumferential direction of the linear oscillating motor 2. The angle between each first tension spring 311 is 90°, and the suspension positions of the four first tension springs 311 have the same height. The second set of tension springs 32 also comprises 4 tension springs, which are also evenly distributed in the circumferential direction of the linear oscillating motor 2, and the angle between each other is 90°. The first tension spring 311 and the second tension spring 321 are arranged in pair and are located in the same plane. The first tension spring 311 and the second tension spring 321 have the same elastic coefficient k, and these two coefficients can be different as well. Since the force beard by the first tension spring 311 is larger, the elastic coefficient k of the first tension spring 311 can be set larger. In other embodiments, more than one first tension springs 311 can be used to correspond to one second tension spring 321. Under this situation, the elastic coefficient k of the second tension spring 321 is preferably greater than that of the first tension spring 311, so that the second tension spring 321 can bear more spring force. Besides, the first tension spring 311 may not be paired with the second tension spring 321. For example, the first tension spring 311 is arranged on the upper half of the motor, while the second tension spring 321 is arranged on the tail part of the motor to form the reaction force of the first tension spring 311. In other words, the number and positions of the first tension spring 311 and the second tension spring 321 do not need to be specifically limited in the present disclosure, as long as the spring forces applied by the two sets of tension springs can enable the linear oscillating motor 2 to be suspended in the fixed hood 1. The spring forces of the tension spring needs to be set according to the dead-weight of the suspended linear oscillating motor 2.

It should be noted that in this embodiment, in order to be compatible with the first vibration isolation device 3, the second vibration isolation device 4 also comprises four sets of the position-limiting block 41, the position-limiting protrusion 42, the internal connection plate 33 and the external connection plate 34. But in other embodiments, the number of the position-limiting block 41 and the position-limiting protrusion 42 can be adjusted according to the actual situation. When handling, moving or transporting the machine assembled with the linear oscillating motor, the low-frequency and large-amplitude vibrations may be caused, which are different with the high-frequency machinery vibrations caused by the normal operation of the machine. Once the low-frequency and large-amplitude vibrations are caused by the external disturbance, the sway in the front-rear radial directions will be limited by the left and right sets of the position-limiting block 41 and the position-limiting protrusion 42, while the sway in the left-right radial directions will be limited by the front and rear sets of the position-limiting block 41 and the position-limiting protrusion 42. Besides, high-frequency and small-amplitude vibrations may also be caused by intense external disturbances. For example, a sudden drop and collision may also cause high-frequency and small-amplitude vibrations and low-frequency and large-amplitude vibrations at the same time.

As shown in FIG. 4 and FIG. 5, the first tension spring 311 and the second tension spring 321 are arranged symmetrically, and the first tension spring 311 is set tension in the oblique-upward direction while the second tension spring 321 is set tension in the oblique-downward direction. The two ends of the springs, the internal connection plate 33 and the external connection plate 34 are all provided with a hook. The hooks at both ends of the first tension spring 311 are connected to the hooks on the upper part of the external connection plate 34 and the internal connection plate 33 respectively. The hooks at both ends of the second tension spring 321 are connected to the hooks on the lower part of the external connection plate 34 and the internal connection plate 33 respectively.

In this embodiment, the internal connection plate 33 and the external connection plate 34 are both metal stamping parts, and the hooks on the internal connection plate 33 and the external connection plate 34 are also manufactured by punching shear. The hooks of the first tension spring 311 and the second tension spring 321 are all ring-shaped. The internal connection plate 33 and the external connection plate 34 are connected to the tension spring by the connection of two hooks. The internal connection plate 33 is welded on the metal housing of the linear oscillating motor 2, and the external connection plate 34 is fixedly installed on the fixed hood 1 by screws. The fixed hood 1 is a plastic shell.

As shown in FIG. 4 and FIG. 5, the position-limiting protrusion 42 is a metal column riveted or welded on the internal connection plate 33, and the position-limiting block 41 is a rubber component embedded in the mounting groove on the external connection plate 34. The Rockwell hardness of the rubber component is 40 to 70 degrees. The position-limiting groove 411 on the position-limiting block 41 is a circular through hole, and the position-limiting protrusion 42 is inserted into the position-limiting groove 411. There is a first movable gap between the position-limiting groove 411 and the position-limiting protrusion 42 allowing for the movements of the linear oscillating motor 2 in its axial and circumferential directions within a limited moving range. Therefore the vibration amplitude of the linear oscillating motor 2 in the axial and circumferential directions are limited, reducing the low-frequency and large-amplitude vibrations of the linear oscillating motor 2.

As shown in FIG. 3, in order to further limit the vibration amplitude of the linear oscillating motor 2 in the radial direction, in this embodiment, the top of the position-limiting block 41 protrudes from the external connection plate 34. There is a certain gap between the top surface of the position-limiting block 41 and the linear oscillating motor 2. Due to the existence of the internal connection plate 33 and the fixed installation of the internal connection plate 33 on the linear oscillating motor 2, the gap between the linear oscillating motor 2 and top surface of the position-limiting block 41 is actually the gap between the internal connection plate 33 and the position-limiting block 41. This gap can allow the linear oscillating motor 2 to move in its radial direction within a limited moving range. Therefore the vibration amplitude of the linear oscillating motor 2 in the radial direction is limited, further reducing the low-frequency and large-amplitude vibrations of the linear oscillating motor 2.

As shown in FIG. 4 and FIG. 5, in this embodiment, as the rubber material of the position-limiting block 41 features with a relatively larger Rockwell hardness, the circumference of the position-limiting groove 411 is larger than that of the position-limiting protrusion 42. If the rubber's Rockwell hardness of the position-limiting block 41 is further reduced, there is no need to set a gap between the position-limiting groove 411 and the position-limiting protrusion 42. When vibrations occur in the linear oscillating motor 2, the position-limiting protrusion 42 can move by compressing the position-limiting block 41, which limits the vibration amplitude of the linear oscillating motor 2.

In this embodiment, the position-limiting block 41 adopts a detachable installation. The mounting groove of the external connection plate 34 is set as a U-shaped groove structure with the top part bent inward, and a groove matching with the bending part is set on the position-limiting block 41. The position-limiting block 41 can be squeezed and inserted from the side of the external connection plate 34 to realize the installation of the position-limiting block 41. When the position-limiting block 41 needs to be dismantled, just pull it out from the side of the external connection plate 34. The top of the position-limiting block 41 protrudes out of the mounting groove. The thickness of the protruding part of the position-limiting block 41 can be changed to adjust the gap size of the second movable gap, thus the vibration amplitude range of the linear oscillating motor 2 in the radial direction is changed. Similarly, changing the dimension of the position-limiting groove 411 on the position-limiting block 41 can also change the vibration amplitude range of the linear oscillating motor 2 in the axial and circumferential directions.

It should be noted that the axial direction of the linear oscillating motor 2 refers to the direction along its central axis, the circumferential direction of the linear oscillating motor 2 refers to the direction along its circumference, and the radial direction of the linear oscillating motor 2 refers to the direction along its diameter. If the linear oscillating motor 2 is placed vertically, as shown in FIG. 2 and FIG. 3, the central axis direction corresponds to the Z-axis direction, the left-right radial directions correspond to the X-axis direction, the front-rear radial direction correspond to the Y-axis direction, and the circumferential direction corresponds to the rotation direction with the Z-axis as the rotation axis. If the rotation in the circumferential direction is limited, the movement in the Y-axis direction is also limited. Thus the position-limiting groove can also limit the vibration amplitude in the front-rear radial direction of FIG. 2. The front and rear two sets of the position-limiting protrusions and the position-limiting blocks can also limit the radial vibrations in the left-right direction. Therefore, the four sets of the position-limiting blocks and the position-limiting protrusions are complementary to each other, and each set can limit the vibrations in more than one direction. In this embodiment, the interaction between the position-limiting protrusion and the position-limiting block can limit the movement of the linear oscillating motor in the Z-axis and Y-axis directions, as well as the rotation in the circumferential direction and the sway of the linear oscillating motor in the left-right and front-rear directions. The movement of the linear oscillating motor in the radial direction can be limited if the top surface of the position-limiting block touches the internal-side surface of the external connection plate.

In this embodiment, a solution is adopted in which the position-limiting protrusion 42 is set on the internal connection plate 33 and the position-limiting block 41 is set on the external connection plate 34. This method is only a preferred mode of the present disclosure. In other embodiments, the positions of the position-limiting block 41 and the position-limiting protrusion 42 can be exchanged, which will not substantially affect the realization of the objective of the present disclosure.

In this embodiment, the first movable gap and the second movable gap are adopted. Under normal stable conditions, the linear oscillating motor 2 often only causes high-frequency and small-amplitude mechanical vibrations, thereby only the first vibration isolation device 3 works while the second vibration isolation device 4 does not work. However, when movement of the reciprocating linear oscillating motor 2 occurs, especially during the transportation, low-frequency and large-amplitude mechanical vibrations will be caused. In this situation, the second vibration isolation device 4 works and plays a role to keep the linear oscillating motor 2 in a stable working state, which can not only reduce the vibrations but also improve the service life of the linear oscillating motor 2.

It should be noted that, in this embodiment, the internal connection plate 33 and the external connection plate 34 are set to facilitate the installation of the first tension spring 311, the second tension spring 321, the position-limiting block 41 and the position-limiting protrusion 42. However in other embodiments, the internal connection plate 33 and the external connection plate 34 may not be set, and the first tension spring 311, the second tension spring 321, the position-limiting block 41 and the position-limiting protrusion 42 can be directly installed on the fixed hood 1 and the housing of the linear oscillating motor 2.

It should also be noted that, in this embodiment, high-frequency and small-amplitude mechanical vibrations are often caused by the normal operation of the linear oscillating motor 2 itself. These vibrations feature relatively high frequency and relatively small amplitude, and noise is easily caused. Due to the suspension installation of the linear oscillating motor 2 by the tension springs, the low-frequency large-amplitude mechanical vibrations are caused external sway or disturbance. If resonance occurs, it will cause greater damage on the linear oscillating motor. In addition, the high-frequency and low-frequency, small-amplitude and large-amplitude in the present disclosure are relative concepts and cannot be limited by a certain value. Under normal circumstances, the amplitude of the mechanical vibrations blocked by the first vibration isolation device will be within the gap ranges of the first movable gap and the second movable gap. The amplitude of the mechanical vibrations blocked by the second vibration isolation device is outside the gap ranges of the first movable gap and the second movable gap. By this means, the second vibration isolation device can play the role of vibration isolation. In the actual working process, the first vibration isolation device can also reduce the low-frequency and large-amplitude mechanical vibrations within a certain range, but it has a certain limitation. When the vibration or disturbance exceeds the limited vibration amplitude, the vibration isolation function of the second vibration isolation device can stabilize the vibration amplitude of the linear oscillating motor within a certain range and avoid a large-amplitude impact.

Stirling engine is another type of reciprocating power engine besides the steam engine and the internal combustion engine. It can be used as a prime motor, a refrigerator, a heat pump, a pressure generator and a power generator. Different from traditional refrigeration or heating theory, Stirling cycle theory is a more efficient thermodynamic theory. For example, the traditional refrigeration cycle is based on vapor compression, which will induce a large amount of irreversible loss when the refrigerant is enthalpy throttling. While the Stirling cycle refrigeration is a pure gaseous process, and its theoretical efficiency is the Carnot efficiency. With the continuous development of new materials and technologies and the increasing shortage of petroleum resources, Stirling engines that can operate with high efficiency have attracted more and more attention by those skilled in the art. During the operating state, the piston will do axial reciprocating movement inside the Stirling engine. If the Stirling engine is directly installed in the external fixed hood 1, it is easy to cause continuous shock and impact that will gradually damage the Stirling engine and reduce the working life of the Stirling engine. Therefore, it is necessary to develop a device that can effectively attenuate the vibrations of the installation structure of the Stirling engine.

The present disclosure provides a Stirling engine that comprises a linear oscillating motor 2 and a fixed hood 1. The said linear oscillating motor 2 is installed in the fixed hood 1 through the aforementioned vibration isolation structure, which can not only attenuate the high-frequency and small-amplitude mechanical vibrations from the linear oscillating motor 2 but also the low-frequency and large-amplitude mechanical vibrations from the linear oscillating motor 2. The vibration isolation structure can effectively attenuate the vibrations. The said linear oscillating motor 2 is a reciprocating linear vibrating motor comprising stator, piston and leaf spring. The leaf spring can be a scroll leaf spring or a strip leaf spring in the prior art. The piston is installed in the stator and the leaf spring is utilized to connect the piston and the stator. The said stator is fixedly installed on the housing of the linear oscillating motor 2. The power output side of the said linear oscillating motor 2 is provided with a heat dissipation ring 21, and the soft vibration-absorbing material is filled between the said heat dissipation ring 21 and the fixed hood 1.

In this embodiment, the heat dissipation ring 21 is a heat dissipation fin structure made of aluminum or copper. The soft vibration-absorbing material is filled between the heat dissipation ring 21 and the fixed hood 1. The soft vibration-absorbing material is made of PU foams, or other types of foams or polyurethane foam materials. In this embodiment, the soft vibration-absorbing material is made into strip-shaped components and wrapped around the outer circumference of the heat dissipation ring 21.

The specific embodiment described herein is only an example to illustrate the spirit of the present disclosure. Those skilled in the art to which the present disclosure pertains can make various modifications or supplements to the described specific embodiment or use similar alternatives, but they will not deviate from the spirit of the present disclosure or exceed the scope defined in the appended claims.

Although the present disclosure uses the following terminologies: the fixed hood 1, the linear oscillating motor 2, the heat dissipation ring 21, the first vibration isolation device 3, the first set of tension springs 31, the first tension spring 311, the second set of tension springs 32, the second tension spring 321, the internal connection plate 33, the external connection plate 34, the second vibration isolation device 4, the position-limiting block 41, the position-limiting groove 411, the position-limiting protrusion 42, but the possibility of using other terms is not excluded. These terms are used only to describe and explain the essence of the present disclosure more conveniently, and interpreting them as any additional limitation is contrary to the spirit of the present disclosure.

What is claimed is:

1. A vibration isolation structure for linear oscillating motor, comprising:
    a first vibration isolation device that is set between a fixed hood and a housing of the linear oscillating motor, configured to attenuate high-frequency and small-amplitude vibrations from the linear oscillating motor; wherein the first vibration isolation device comprises a first set of tension springs and a second set of tension springs; the first set of the tension springs and the second set of the tension springs are both connected to the fixed hood and the housing of the linear oscillating motor to suspend the linear oscillating motor in the fixed hood, forming a lateral gap between the linear oscillating motor and the fixed hood; and
    a second vibration isolation device that is set in the lateral gap to attenuate low-frequency and large-amplitude vibrations from the linear oscillating motor; wherein the second vibration isolation device comprises at least two sets of position-limiting protrusions and position-limiting blocks; the position-limiting protrusions and position-limiting blocks are set in a match on the linear oscillating motor and the fixed hood respectively or reversely, configured to limit the moving range of the linear oscillating motor in the fixed hood;
    one of the at least two sets of the position-limiting blocks comprises a position-limiting groove for the insertion of one of the at least two sets of the position-limiting protrusions; wherein a first movable gap between the position-limiting groove and one of the at least two sets of the position-limiting protrusions which is inserted into the position-limiting groove is configured to limit the axial vibration and circumferential vibration of the linear oscillating motor to a certain amplitude;
    wherein one of the at least two sets of the position-limiting blocks is installed on the fixed hood; wherein a second movable gap between one of the at least two sets of the position-limiting blocks and the linear oscillating motor is configured to limit the radial vibration of the linear oscillating motor to a certain amplitude;

an external connection plate is fixedly installed on the fixed hood and one of the at least two sets of the position-limiting blocks is installed on the external connection plate; wherein an internal connection plate is fixedly installed on the linear oscillating motor and one of the at least two sets of the position-limiting protrusions is installed on the internal connection plate;

one of the at least two sets of the position-limiting blocks is detachably installed on the external connection plate, configured to adjust the moving range of the linear oscillating motor by replacing one of the at least two sets of the position-limiting blocks;

the external connection plate comprises a mounting groove, and one of the at least two sets of the position-limiting blocks is embedded in the mounting groove; the mounting groove of the external connection plate is set as a U-shaped groove structure with a top part bent inward, and a groove matching with the bent part is set on one of the at least two sets of the position-limiting blocks, so that one of the at least two sets of the position-limiting blocks is capable of being squeezed and inserted from a side of the external connection plate to realize the installation of one of the at least two sets of the position-limiting blocks.

2. The vibration isolation structure for linear oscillating motor of claim 1, wherein the axes of the position-limiting groove and one of the at least two sets of the position-limiting protrusions are both perpendicular to the axis of the linear oscillating motor.

3. The vibration isolation structure for linear oscillating motor of claim 1, wherein the material of one of the at least two sets of the position-limiting blocks is rubber, and one of the at least two sets of the position-limiting protrusions is cylinder-shaped; wherein a round hole is drilled in the rubber block to form the position-limiting groove.

4. The vibration isolation structure for linear oscillating motor of claim 1, wherein the external connection plate comprises a mounting groove; wherein one of the at least two sets of the position-limiting blocks is embedded in the mounting groove while keeping the top of one of the at least two sets of the position-limiting blocks protruding out of the mounting groove.

5. The vibration isolation structure for linear oscillating motor of claim 1, wherein the first set of the tension springs comprises at least three first tension springs, configured to evenly distributed around the circumference of the linear oscillating motor in an upward direction; wherein the second set of the tension springs comprises at least one second tension spring; wherein the spring forces applied to the linear oscillating motor by the first set of the tension springs and the second set of the tension springs form a reaction force pair.

6. The vibration isolation structure for linear oscillating motor of claim 4, wherein the first set of the tension springs comprises four first tension springs while the second set of the tension springs comprises four second tension springs; wherein the first tension spring and the second tension spring are arranged in pairs.

7. The vibration isolation structure for linear oscillating motor of claim 6, wherein the first tension spring and the second tension spring are arranged symmetrically; wherein the first tension spring is set in tension in the oblique-upward direction while the second tension spring is set in tension in the oblique-downward direction.

8. The vibration isolation structure for linear oscillating motor of claim 6, wherein the two ends of the first tension spring are connected to the internal connection plate and the upper part of the external connection plate respectively; wherein the two ends of the second tension spring are connected to the internal connection plate and the lower part of the external connection plate respectively.

9. The vibration isolation structure for linear oscillating motor of claim 8, wherein the two ends of the said internal connection plate and the external connection plate are provided with a hook; wherein the ends of the first tension spring and the second tension spring are all installed on the corresponding hooks.

10. A Stirling engine comprises
a linear oscillating motor and a fixed hood, wherein the linear oscillating motor is installed in the fixed hood through the vibration isolation structure of claim 7.

11. The Stirling engine of claim 10, wherein a power output side of the linear oscillating motor is provided with a heat dissipation ring and a soft vibration-absorbing material is filled between the heat dissipation ring and the fixed hood.

* * * * *